United States Patent
Yamamoto

(10) Patent No.: US 6,738,196 B2
(45) Date of Patent: May 18, 2004

(54) ZOOM LENS WITH DISTORTION CORRECTION AND PROJECTION OPTICAL APPARATUS USING IT

(75) Inventor: Chikara Yamamoto, Kodaira (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/320,384

(22) Filed: Dec. 17, 2002

(65) Prior Publication Data
US 2003/0165019 A1 Sep. 4, 2003

(30) Foreign Application Priority Data
Dec. 26, 2001 (JP) .......................... 2001-394455

(51) Int. Cl.[7] ................................ G02B 15/14
(52) U.S. Cl. ...................... 359/680; 359/681
(58) Field of Search ................. 359/680, 681, 359/682

(56) References Cited
U.S. PATENT DOCUMENTS

| 4,572,620 | A | 2/1986 | Kikuchi |
| 5,331,462 | A | 7/1994 | Yano |
| 6,008,952 | A | 12/1999 | Yamamoto |
| 6,222,680 | B1 | 4/2001 | Yamamoto et al. |
| 6,480,340 | B1 * | 11/2002 | Yamamoto ................. 359/676 |

* cited by examiner

*Primary Examiner*—David N. Spector
(74) *Attorney, Agent, or Firm*—Arnold International; Jon W. Henry; Bruce Y. Arnold

(57) ABSTRACT

A zoom lens has a lens group of negative refractive power at the enlarging end and a lens group of positive refractive power at the reducing end, both of which are fixed during zooming. The lens group of negative refractive power includes two lens components of negative refractive power, and at least one of the lens groups includes a thin plastic lens element with a lens surface bonded to a lens surface of a glass lens element, with the other lens surface of the plastic lens element having an aspheric shape. The lens group of negative refractive power consists of lens elements of negative refractive power. One of the two lens components is at the enlarging end of the zoom lens and includes a meniscus lens element of negative refractive power. The other lens component is adjacent the one lens component and is a biconcave lens component.

17 Claims, 9 Drawing Sheets

Spherical Aberration

Astigmatism

Distortion

Lateral Color

Spherical Aberration

Astigmatism

Distortion

Lateral Color

Spherical Aberration

Astigmatism

Distortion

Lateral Color

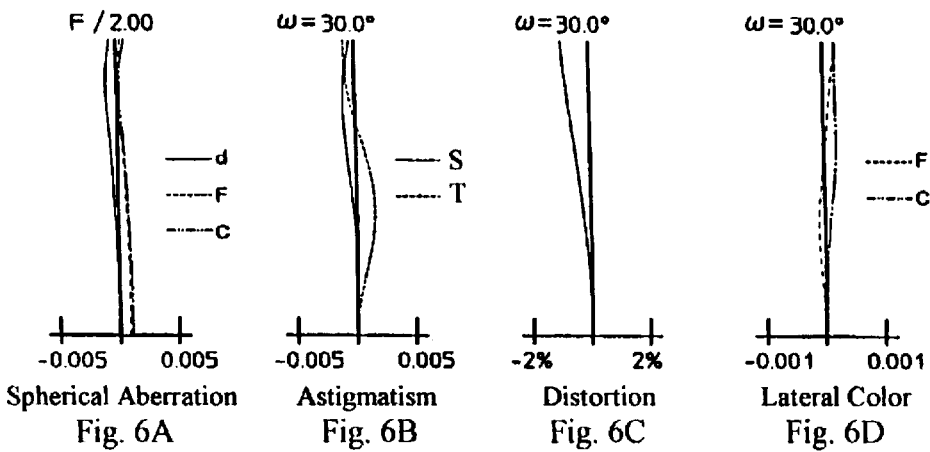
Fig. 6A Spherical Aberration
Fig. 6B Astigmatism
Fig. 6C Distortion
Fig. 6D Lateral Color
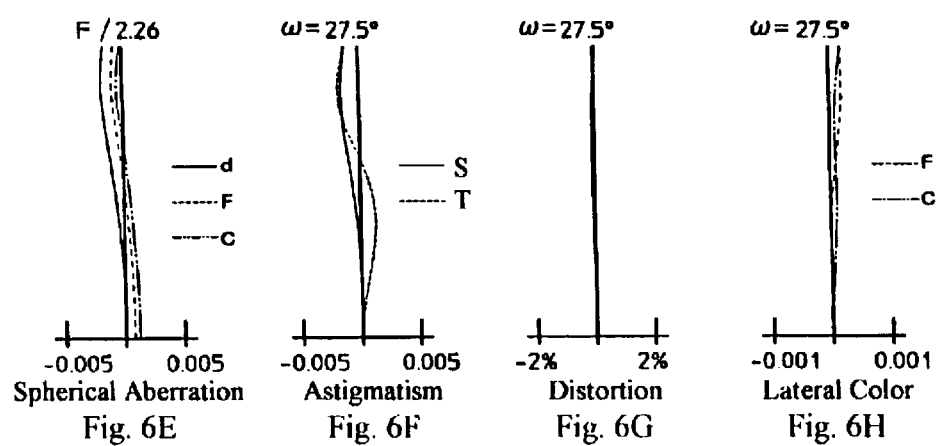
Fig. 6E Spherical Aberration
Fig. 6F Astigmatism
Fig. 6G Distortion
Fig. 6H Lateral Color
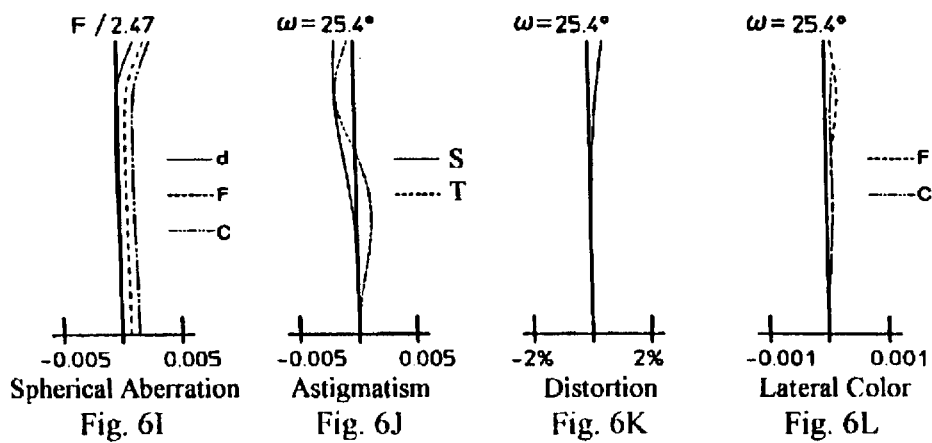
Fig. 6I Spherical Aberration
Fig. 6J Astigmatism
Fig. 6K Distortion
Fig. 6L Lateral Color

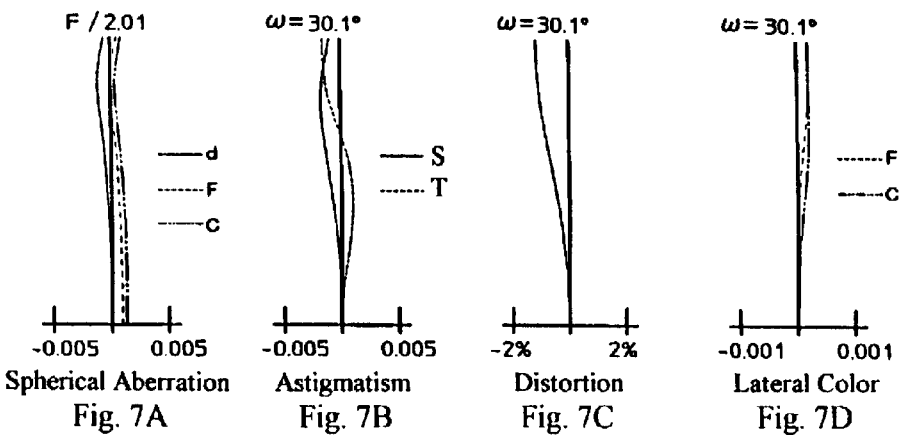
Fig. 7A Spherical Aberration
Fig. 7B Astigmatism
Fig. 7C Distortion
Fig. 7D Lateral Color
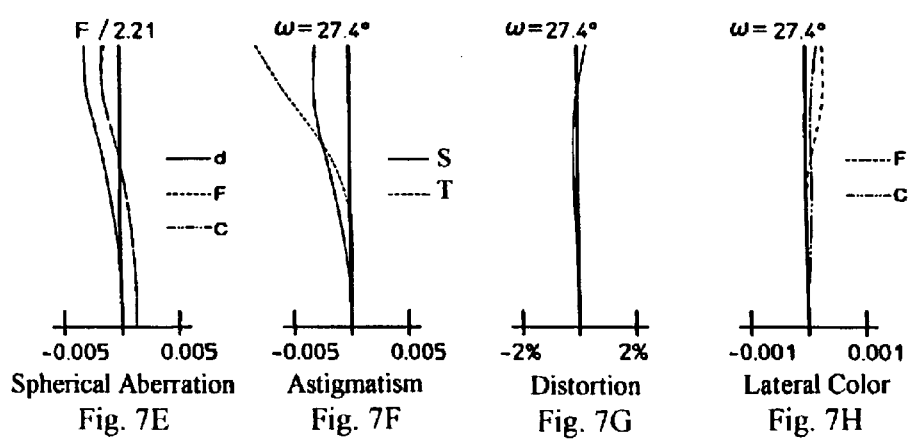
Fig. 7E Spherical Aberration
Fig. 7F Astigmatism
Fig. 7G Distortion
Fig. 7H Lateral Color
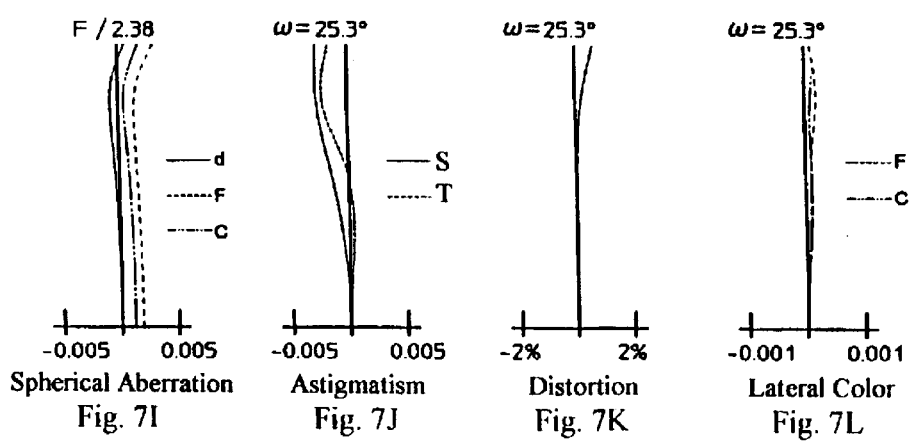
Fig. 7I Spherical Aberration
Fig. 7J Astigmatism
Fig. 7K Distortion
Fig. 7L Lateral Color

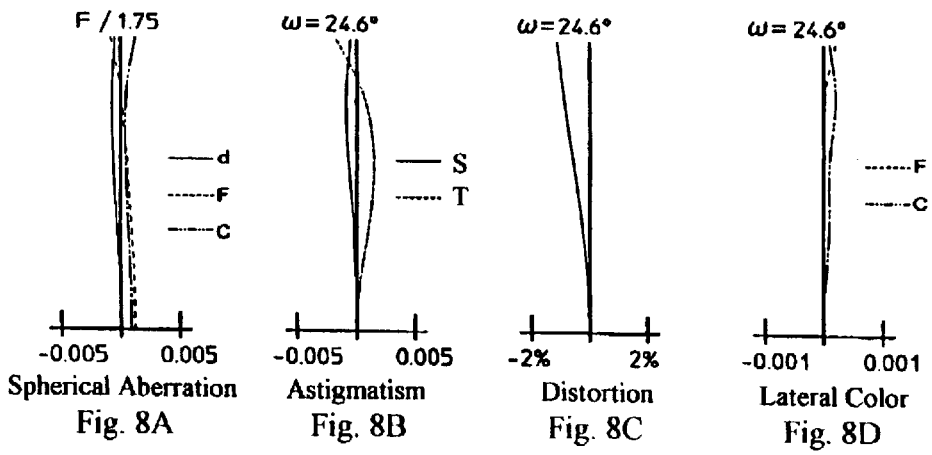
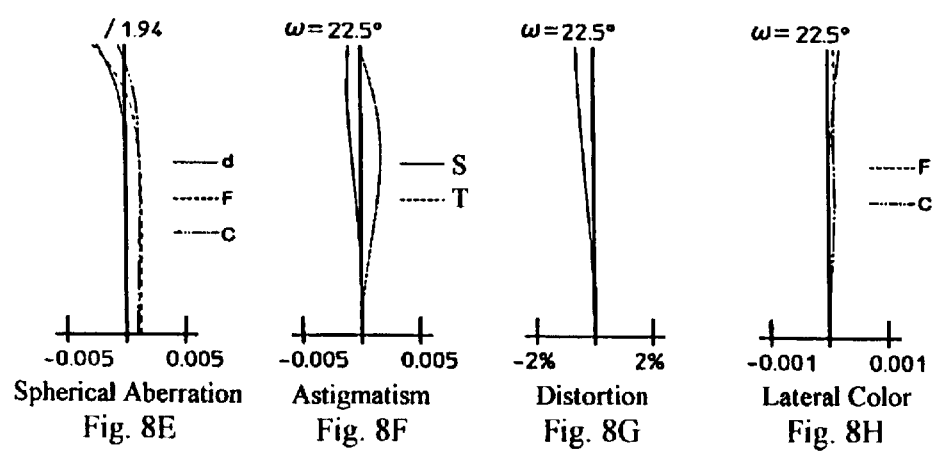
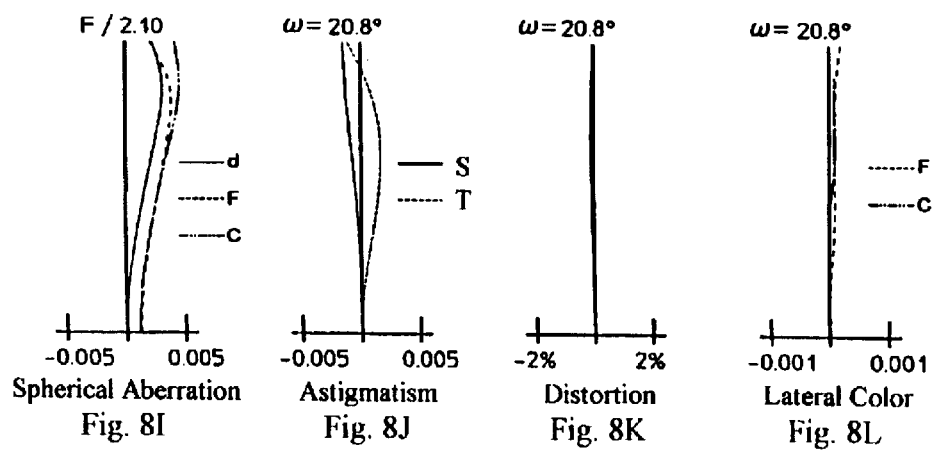

ZOOM LENS WITH DISTORTION CORRECTION AND PROJECTION OPTICAL APPARATUS USING IT

BACKGROUND OF THE INVENTION

There is a great demand for zoom lenses with wider projection angles and greater brightness in projection systems, such as projection televisions using liquid crystal display elements or digital micromirror devices (DMD). An optical system that is telecentric on the reducing side is used in prior art projection systems that employ an X-shaped dichroic prism or a totally reflecting prism on the reducing side. However, the use of a telecentric optical system makes it difficult to correct distortion in zoom projection lenses.

Japanese Laid Open Patent Applications H10–268193 and 2000–292701 disclose improved zoom lenses, each of which uses a positive lens component that is outermost on the enlarging side of the zoom lens in order to reduce distortion. However, having a positive lens component as the outermost lens component on the enlarging side requires a larger lens diameter in order to maintain image brightness and a wide projection angle, which reduces the desired compactness of the zoom lens.

Additionally, it is known that an aspherical lens surface is useful for correcting aberrations, including distortion. An aspherical lens surface can be obtained by processing a glass lens or a plastic lens so as to form an aspherical surface on it. However, obtaining an aspherical lens surface on a glass lens is a costly process, especially for a larger diameter lens. Moreover, in order to prevent distortion, aspherical surfaces are required on the outermost surface of both the enlarging side and the reducing side of projection zoom lenses. Further, when an aspherical plastic lens element is used, the optical properties of the lens element fluctuate significantly with temperature. When a plastic lens element is used that has a large refractive index, it is especially difficult to design a compact projection lens with small temperature-dependent fluctuations in optical properties. Aberrations, including distortion, are usually better corrected if plastic lens elements that are used do not have a large refractive index. However, in such a case, it is difficult to produce a zoom projection lens that is compact.

BRIEF SUMMARY OF THE INVENTION

The present invention is a zoom lens useful for image pick-up devices, such as CCDs and camera tubes, film cameras, and particularly for use as a projection lens for projection televisions that use digital image devices, such as digital micro devices (DMDs). The present invention provides a bright, compact, and inexpensive zoom lens having less temperature dependent fluctuations in optical properties as well as reduced aberrations, especially distortion.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 6A–6D show aberrations of Embodiment 2 of the zoom lens of the present invention at the wide-angle end;

FIGS. 6E–6H show aberrations of Embodiment 2 of the zoom lens of the present invention at an intermediate position;

FIGS. 6I–6L show aberrations of Embodiment 2 of the zoom lens of the present invention at the telephoto end;

FIGS. 7A–7D show aberrations of Embodiment 3 of the zoom lens of the present invention at the wide-angle end;

FIGS. 7E–7H show aberrations of Embodiment 3 of the zoom lens of the present invention at an intermediate position;

FIGS. 7I–7L show aberrations of Embodiment 3 of the zoom lens of the present invention at the telephoto end;

FIGS. 8A–8D show aberrations of Embodiment 4 of the zoom lens of the present invention at the wide-angle end;

FIGS. 8E–8H show aberrations of Embodiment 4 of the zoom lens of the present invention at an intermediate position;

FIGS. 8I–8L show aberrations of Embodiment 4 of the zoom lens of the present invention at the telephoto end.

DETAILED DESCRIPTION OF THE INVENTION

Figure 1:
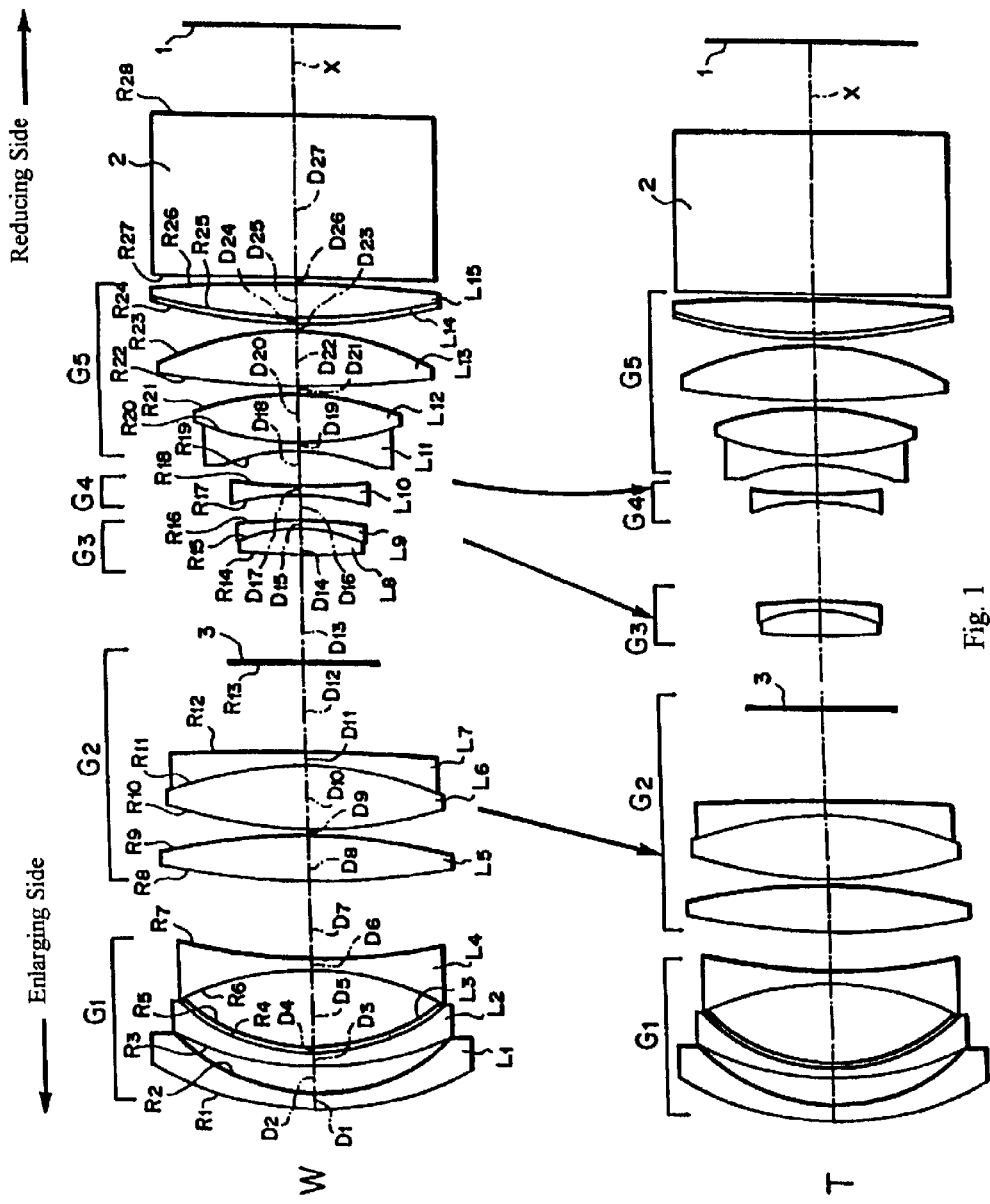
FIG. 1 shows a cross-sectional view of Embodiment 1 of the zoom lens of the present invention at the wide-angle end W and the telephoto end T.

The zoom lens of the present invention is formed of, in order from the enlarging side: a lens group of negative refractive power that is fixed during zooming; lens groups that provide zooming; and a lens group of positive refractive power that is fixed during zooming. Preferably, the lens group of negative refractive power that is fixed during zooming is moved for focusing, and the zoom lens is telecentric on the reducing side.

At least one lens surface of one of the lens groups that is fixed during zooming is a surface of aspheric shape that is formed of a thin, plastic, resin layer. The other surface of the thin, plastic, resin layer is bonded to a lens surface of a lens element that is made of glass to thereby form a doublet lens component. The thin, plastic resin layer is actually a lens element. The term "lens element" is herein defined as a single transparent mass of refractive material. The term "lens component" is herein defined as: (a) a single lens element spaced so far from any adjacent lens element that the spacing cannot be neglected in computing the optical image-forming properties of the lens elements, or (b) two or more lens elements that have their adjacent lens surfaces either in full overall contact or so close together that the spacings between adjacent lens surfaces of the different lens elements are so small that the spacings can be neglected in computing the optical image-forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." The term "lens group" is used herein to define an assembly of one or more lens components that are fixed, or are movable as a single unit.

Aspheric surfaces are used to help minimize distortion that may be increased by the use of negative lens components in the lens group of negative refractive power at the enlarging end of the zoom lens. Making an aspheric lens surface on a plastic layer that is bonded to a glass lens element is cheaper than making a surface of a glass lens element aspheric. Keeping the plastic layer thin helps avoid problems of fluctuations of optical properties of the aspheric lens component that a thicker plastic layer might create due to the variations in physical and optical properties of plastic with changes in environmental conditions, such as temperature and humidity. In the present invention, the on-axis thickness of the thin plastic layer is less than one-quarter of the on-axis thickness of the glass lens element to which it is bonded. Furthermore, where two plastic layers (i.e., lens elements) are used on different glass surfaces, by making the two plastic layers have opposite refractive power, fluctuations of optical properties due to temperature and humidity variations affecting the plastic are further reduced.

Moving the lens group on the enlarging end for focusing allows focus adjusting mechanisms to be conveniently mounted at the most accessible position for operation in a projection-type optical apparatus in which a zoom lens is mounted. There is no need to use the lens group on the reducing end for focusing, thereby avoiding difficulties of maintaining telecentricity if that lens group were moved for focusing. Therefore, using the lens group at the enlarging end for focusing is particularly advantageous.

Those surfaces that are aspherical satisfy the following equation:

$$Z=[CY^2/\{1+(1-K\,C^2Y^2)^{1/2}\}]+A_4Y^4+A_6Y^6+A_8Y^8+A_{10}Y^{10} \quad \text{(Equation A)}$$

where

Z is the length (in mm) of a line drawn from a point on the aspherical surface at a distance Y from the optical axis to the tangential plane of the aspherical surface vertex, C (=1/R) is the curvature of the aspherical surface near the optical axis, Y is the distance (in mm) from the optical axis, K is the eccentricity, and $A_4$, $A_6$, $A_8$, and $A_{10}$ are the 4th, 6th, 8th, and 10th aspherical coefficients.

Four embodiments of the present invention will now be described with reference to the drawings. In all four embodiments, refractive optical elements, including lens elements, are referenced by the letter L with a subscript denoting their order from the enlarging side of the zoom lens, and similarly the radii of curvature of the surfaces of those optical elements, generally lens surfaces, are referenced by the letter R with a subscript denoting their order from the enlarging side of the zoom lens. The on-axis surface spacings (along the optical axis X of the figures) of all the optical surfaces are referenced by the letter D with a subscript denoting their order from the enlarging side of the zoom lens. In the same manner, the five lens groups of the four embodiments are labeled $G_1$ through $G_5$ in order from the enlarging side of the zoom lens and the lens components belonging to each lens group are indicated by upper brackets adjacent the labels $G_1$–$G_5$ in FIGS. 1–4. Directional arrows in the figures indicate the general movement of the movable lens groups during zooming.

Embodiment 1

FIG. 1 shows the basic lens element configurations of the zoom lens of Embodiment 1 applied to a projection optical apparatus as a projection lens at the wide-angle end W and at the telephoto end T. In FIG. 1, directional arrows are used to indicate the directions of movements of various lens groups when moving from the wide-angle end configuration to the telephoto end configuration. As shown in FIG. 1, the zoom lens of Embodiment 1 comprises, from the enlarging side, a negative first lens group $G_1$, a positive second lens group $G_2$, a positive third lens group $G_3$, a negative fourth lens group $G_4$, and a positive fifth lens group $G_5$, arranged for telecentricity on the reducing side.

The first lens group $G_1$ includes, from the enlarging side, a negative lens component $L_1$, a composite aspherical lens component consisting of a negative lens element $L_2$ and a thin plastic negative aspherical lens element $L_3$, and a negative biconcave lens component $L_4$, in this order. The second lens group $G_2$ includes, from the enlarging side, a positive lens component $L_5$, a doublet consisting of a positive lens element $L_6$ and a negative meniscus lens element $L_7$, and a stop 3, in this order. The third lens group $G_3$ includes, from the enlarging side, a doublet consisting of a positive lens element $L_8$ and a negative lens element $L_9$, in this order. The fourth lens group $G_4$ is formed of a single negative lens component $L_{10}$. The fifth lens group $G_5$ includes, from the enlarging side, a doublet consisting of a negative lens element $L_{11}$ and a positive lens element $L_{12}$, a positive lens component $L_{13}$, and a composite aspherical lens component consisting of a thin plastic aspherical lens element $L_{14}$ and a positive lens element $L_{15}$, in this order.

The two composite aspherical lens components each consist of a doublet of a plastic lens element $L_3$ or $L_{14}$ that is thin, as measured along the optical axis, and a glass lens element $L_2$ or $L_{15}$. The lens surfaces of the plastic lenses that are not bonded to the glass lenses $L_2$, $L_{15}$ are aspherical.

The first lens group $G_1$ is fixed during zooming. The lens groups $G_2$, $G_3$, and $G_4$ are moved in a specified relationship so as to serve for continuous zooming and correction of image plane shift caused by the continuous zooming. The fifth lens group $G_5$ is fixed during zooming. The distance between the second and third lens groups $G_2$ and $G_3$ is reduced as the zoom lens is changed from a wide-angle configuration towards a telephoto configuration, which helps to maintain compactness of the zoom lens.

A filter for eliminating infrared light, or a low-pass filter, a color composition optical system 2, and an image modulation light valve 1, such as a liquid crystal display panel or DMD, may be arranged on the reducing side of the fifth lens group $G_5$. The stop 3 between the second and third lens groups $G_2$ and $G_3$ moves with the lens group $G_2$ to maintain telecentricity on the reducing side with zooming. The first lens group $G_1$ is moved for focusing.

Table 1 below lists the surface number #, in order from the enlarging side, the radius of curvature R of each surface near the optical axis, the on-axis surface spacing D, as well as the refractive index $N_d$ and the Abbe number $v_d$ (at the d line) of each lens element for Embodiment 1. The numerical values of R and D are based on a normalized focal length of 1 at the wide-angle end configuration of the zoom lens of Embodiment 1.

TABLE 1

| # | R | D | $N_d$ | $\nu_d$ |
|---|---|---|---|---|
| 1 | 1.6767 | 0.0844 | 1.51680 | 64.2 |
| 2 | 1.0013 | 0.1568 | | |
| 3 | 1.6662 | 0.0708 | 1.77250 | 49.6 |
| 4 | 1.0216 | 0.0041 | 1.52771 | 41.8 |
| 5* | 0.9424 | 0.4577 | | |
| 6 | −1.4984 | 0.0626 | 1.48749 | 70.2 |
| 7 | 3.3574 | $D_7$ (variable) | | |
| 8 | 3.9898 | 0.2535 | 1.80400 | 46.6 |
| 9 | −3.0397 | 0.0238 | | |
| 10 | 2.3513 | 0.3457 | 1.80610 | 40.9 |
| 11 | −1.8866 | 0.0654 | 1.84667 | 23.8 |
| 12 | −15.3563 | 0.5174 | | |
| 13 | ∞ (stop) | $D_{13}$ (variable) | | |
| 14 | 4.9818 | 0.1416 | 1.77250 | 49.6 |
| 15 | −0.7850 | 0.0436 | 1.83481 | 42.7 |
| 16 | −2.7325 | $D_{16}$ (variable) | | |
| 17 | −1.2701 | 0.0409 | 1.51742 | 52.4 |
| 18 | 3.7928 | $D_{18}$ (variable) | | |
| 19 | −1.1501 | 0.0517 | 1.84667 | 23.8 |
| 20 | 1.5472 | 0.2631 | 1.51680 | 64.2 |
| 21 | −1.5472 | 0.0363 | | |
| 22 | 4.7966 | 0.3044 | 1.79952 | 42.2 |
| 23 | −1.5400 | 0.0312 | | |
| 24* | 2.4375 | 0.0055 | 1.52771 | 41.8 |
| 25 | 2.7045 | 0.2240 | 1.77250 | 49.6 |
| 26 | −8.4942 | 0.0272 | | |
| 27 | ∞ | 0.8719 | 1.51633 | 64.1 |
| 28 | ∞ | | | |

Those surfaces with a * to the right of the surface number in Table 1 are aspherical, and the aspherical surface shape is expressed by Equation (A) above.

Table 2 below lists the values of the constants K, $A_4$, $A_6$, $A_8$, and $A_{10}$ used in Equation (A) above for each of the aspherical surfaces indicated in Table 1. An "E" in the data indicates that the number following the "E" is the exponent to the base 10. For example, "1.0E−02" represents the number $1.0 \times 10^{-2}$.

TABLE 2

| # | K | $A_4$ | $A_6$ | $A_8$ | $A_{10}$ |
|---|---|---|---|---|---|
| 5 | 0.3936 | 1.114E−2 | −2.484E−2 | 6.156E−2 | −3.166E−2 |
| 24 | 1.0010 | −4.633E−2 | 1.538E−2 | −2.412E−2 | 5.244E−3 |

As is apparent from Tables 1 and 2 and FIG. 1, in the zoom lens of Embodiment 1, surface #5 and surface #24 are aspherical. As set forth above, the aspherical surfaces are each one surface of a plastic lens element of which the other lens surface is bonded to a glass lens element.

In the zoom lens of Embodiment 1, the second lens group $G_2$, the third lens group $G_3$, and the fourth lens group $G_4$ move during zooming. Therefore, the values of the on-axis spacings $D_7$, $D_{13}$, $D_{16}$ and $D_{18}$ between the lens groups change with zooming. Table 3 below lists the values of the variables $D_7$, $D_{13}$, $D_{16}$ and $D_{18}$ (i.e., the group spacings) at the wide-angle end (Wide), at an intermediate focal length (Middle) and at the telephoto end (Tele).

TABLE 3

| # | Wide | Middle | Tele |
|---|---|---|---|
| $D_7$ | 0.4192 (0.4263) | 0.3078 (0.3149) | 0.2154 (0.2226) |
| $D_{13}$ | 0.5936 | 0.4737 | 0.4223 |
| $D_{16}$ | 0.1361 | 0.3397 | 0.5364 |
| $D_{18}$ | 0.1862 | 0.2139 | 0.1610 |

The numbers not in parentheses in Table 3 are for the conjugate position at infinity on the enlarging side. The numbers in parentheses in Table 3 are the group spacings on the enlarging side at the near point, which is positioned 114.8 (normalized units) from the enlarging side of the lens.

Figure 5A:
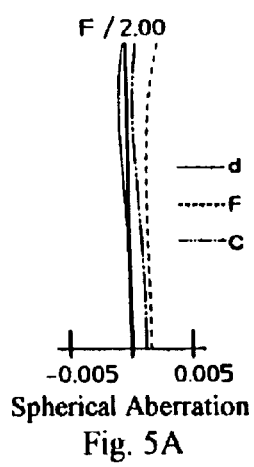
FIGS. 5A–5D show aberrations of Embodiment 1 of the zoom lens of the present invention at the wide-angle end.
Figure 5B:
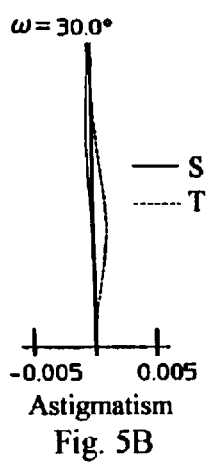
Figure 5C:
Figure 5D:
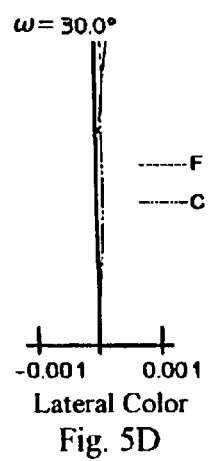
Figure 5E:
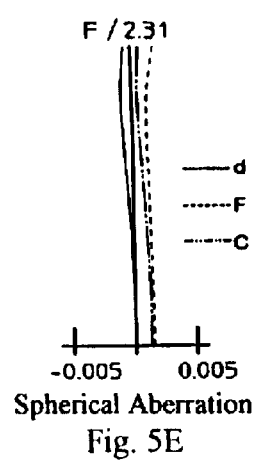
FIGS. 5E–5H show aberrations of Embodiment 1 of the zoom lens of the present invention at an intermediate position.
Figure 5F:
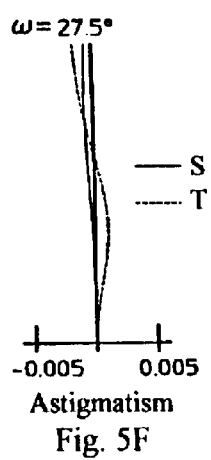
Figure 5G:
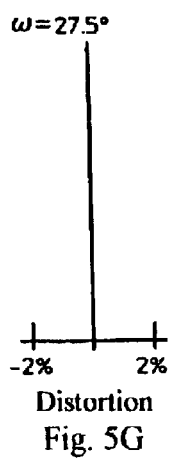
Figure 5H:
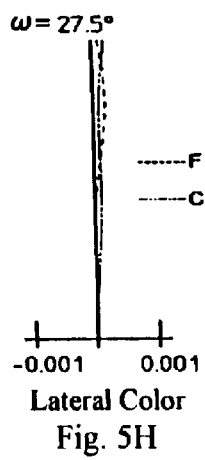
Figure 5I:
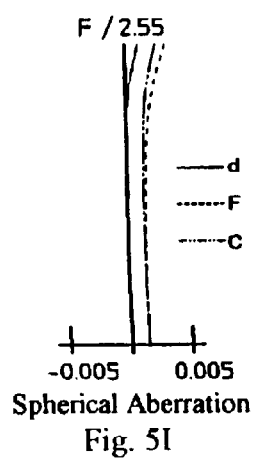
FIGS. 5I–5L show aberrations of Embodiment 1 of the zoom lens of the present invention at the telephoto end.
Figure 5J:
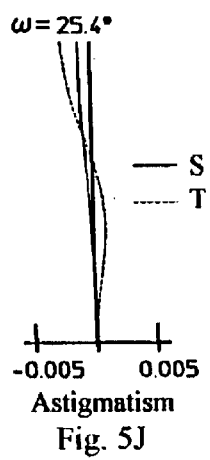
Figure 5K:
Figure 5L:

FIGS. 5A–5D show the spherical aberration, astigmatism, distortion, and lateral color, respectively, of the zoom lens of Embodiment 1 at the wide-angle end. FIGS. 5E–5H show the spherical aberration, astigmatism, distortion, lateral color, respectively, of the zoom lens of Embodiment 1 at the intermediate focal length, and FIGS. 5I–5L show the spherical aberration, astigmatism, distortion, and lateral color, respectively, of the zoom lens of Embodiment 1 at the telephoto end. In FIGS. 5A, 5E and 5I, the spherical aberration is shown for the wavelengths 587.6 nm (the d-line), 486.1 nm (the F-line), and 656.3 nm (the C-line). In the remaining figures, ω is the half-picture angle. In FIGS. 5B, 5F and 5J, the astigmatism is shown for both the sagittal image surface S and the tangential image surface T. In FIGS. 5C, 5G and 5K, distortion is measured at 587.6 nm (the d-line). In FIGS. 5D, 5H and 5L, the lateral color is shown for the wavelengths 486.1 nm (the F-line) and 656.3 nm (the C-line) relative to the 587.6 nm (the d-line). As is apparent from these figures, the various aberrations are favorably corrected.

Embodiment 2

Figure 2:
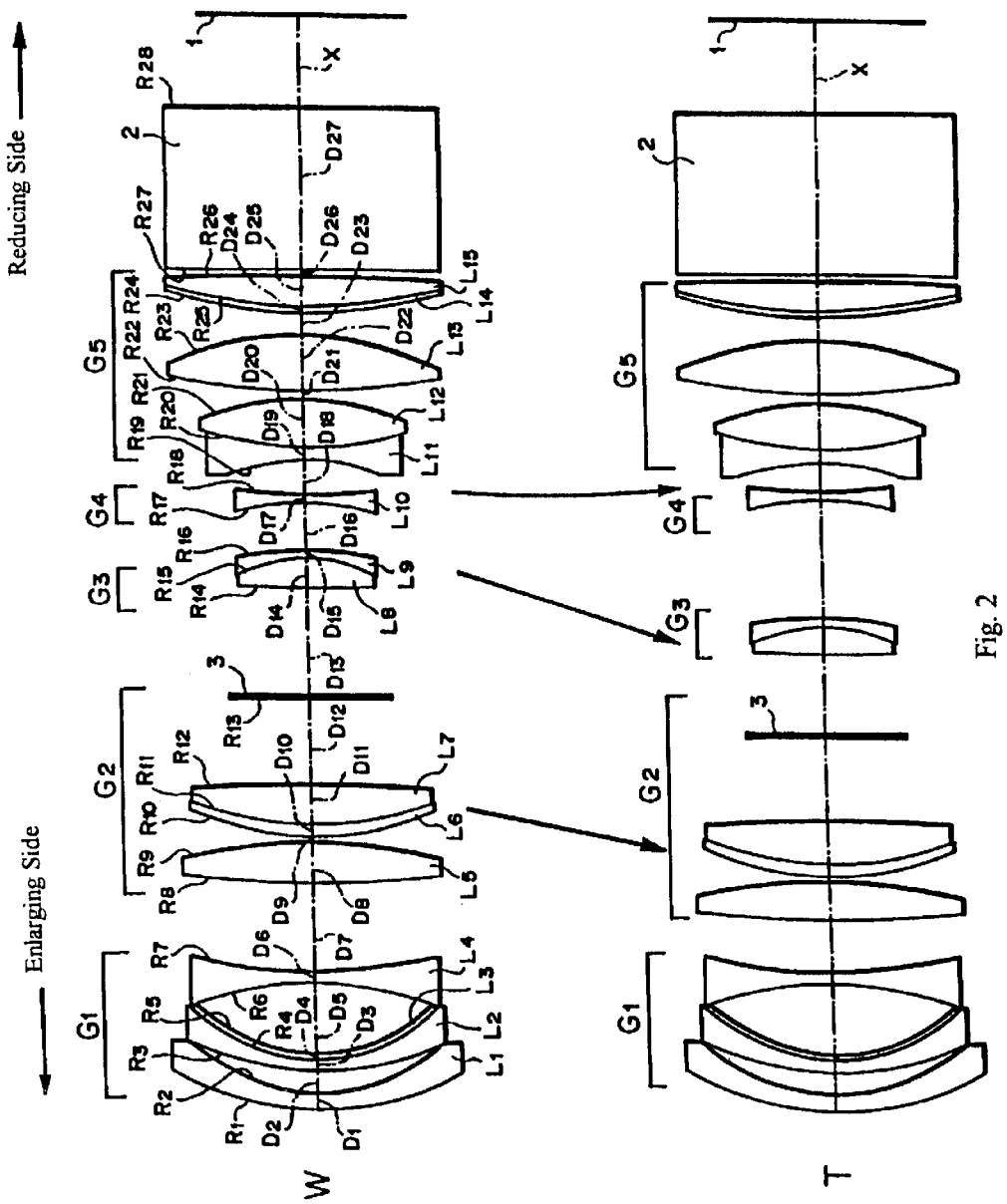
FIG. 2 shows a cross-sectional view of Embodiment 2 of the zoom lens of the present invention at the wide-angle end W and the telephoto end T.

FIG. 2 shows the basic lens element configurations of the zoom lens of Embodiment 2 applied to a projection optical apparatus as a projection lens at the wide-angle end W and at the telephoto end T. Embodiment 2 is very similar to Embodiment 1 and similarly uses five lens groups. Because Embodiment 2 is very similar to Embodiment 1, only the differences between Embodiment 2 and Embodiment 1 will be explained for Embodiment 2. Whereas in Embodiment 1 the doublet of the second lens group is formed of a positive lens element $L_6$ and a negative meniscus lens element $L_7$, in Embodiment 2 it is formed of positive meniscus lens element $L_6$ and a biconvex lens element $L_7$.

Table 4 below lists the surface number #, in order from the enlarging side, the radius of curvature R of each surface near the optical axis, the on-axis surface spacing D, as well as the refractive index $N_d$ and the Abbe number $\nu_d$ (at the d line) of each lens element for Embodiment 2. The numerical values of R and D are based on a normalized focal length of 1 at the wide-angle end configuration of the zoom lens of Embodiment 2.

TABLE 4

| # | R | D | $N_d$ | $\nu_d$ |
|---|---|---|---|---|
| 1 | 1.6170 | 0.0845 | 1.80519 | 25.4 |
| 2 | 1.0123 | 0.1228 | | |
| 3 | 1.5991 | 0.0708 | 1.51823 | 58.9 |
| 4 | 0.9573 | 0.0041 | 1.52771 | 41.8 |
| 5* | 0.8779 | 0.4098 | | |
| 6 | −1.7885 | 0.0627 | 1.49700 | 81.5 |
| 7 | 2.6608 | $D_7$ (variable) | | |
| 8 | 6.4085 | 0.2187 | 1.83481 | 42.7 |
| 9 | −2.8072 | 0.0207 | | |

TABLE 4-continued

| # | R | D | $N_d$ | $v_d$ |
|---|---|---|---|---|
| 10 | 1.6980 | 0.0654 | 1.51742 | 52.4 |
| 11 | 1.8806 | 0.2244 | 1.49700 | 81.5 |
| 12 | −7.7673 | 0.4632 | | |
| 13 | ∞ (stop) | $D_{13}$ (variable) | | |
| 14 | 6.0155 | 0.1592 | 1.65100 | 56.2 |
| 15 | −0.7872 | 0.0436 | 1.74400 | 44.8 |
| 16 | −1.9482 | $D_{16}$ (variable) | | |
| 17 | −1.3732 | 0.0409 | 1.54814 | 45.8 |
| 18 | 3.5530 | $D_{18}$ (variable) | | |
| 19 | −1.0910 | 0.0518 | 1.84667 | 23.8 |
| 20 | 1.5214 | 0.2667 | 1.60301 | 65.4 |
| 21 | −1.4344 | 0.0408 | | |
| 22 | 3.6141 | 0.2924 | 1.83400 | 37.2 |
| 23 | −1.8215 | 0.1121 | | |
| 24* | 2.2577 | 0.0055 | 1.52771 | 41.8 |
| 25 | 2.6177 | 0.2063 | 1.63854 | 55.4 |
| 26 | −16.6086 | 0.0272 | | |
| 27 | ∞ | 0.8724 | 1.51633 | 64.1 |
| 28 | ∞ | | | |

Those surfaces with an * to the right of the surface number in Table 4 are aspherical, and the aspherical surface shape is expressed by Equation (A) above.

Table 5 below lists the values of the constants K, $A_4$, $A_6$, $A_8$, and $A_{10}$ used in Equation (A) above for each of the aspherical surfaces indicated in Table 4. An "E" in the data indicates that the number following the "E" is the exponent to the base 10. For example, "1.0E-02" represents the number $1.0 \times 10^{-2}$.

TABLE 5

| # | K | $A_4$ | $A_6$ | $A_8$ | $A_{10}$ |
|---|---|---|---|---|---|
| 5 | 0.2940 | 4.338E−2 | −1.803E−2 | 9.033E−2 | −1.174E−1 |
| 24 | 0.9479 | −5.831E−2 | 1.762E−2 | −5.089E−2 | 1.821E−2 |

As is apparent from Tables 4 and 5 and FIG. 2, in the zoom lens of Embodiment 2, surface #5 and surface #24 are aspherical. As set forth above, the aspherical surfaces are each one surface of a plastic lens element of which the other lens surface is bonded to a glass lens element.

In the zoom lens of Embodiment 2, the second lens group $G_2$, the third lens group $G_3$, and the fourth lens group $G_4$ move during zooming. Therefore, the values of the on-axis spacings $D_7$, $D_{13}$, $D_{16}$ and $D_{18}$ between the lens groups change with zooming. Table 6 below lists the values of the variables $D_7$, $D_{13}$, $D_{16}$ and $D_{18}$ (i.e., the group spacings) at the wide-angle end (Wide), at an intermediate focal length (Middle) and at the telephoto end (Tele).

TABLE 6

| # | Wide | Middle | Tele |
|---|---|---|---|
| $D_7$ | 0.4911 (0.4982) | 0.3819 (0.3890) | 0.2917 (0.2988) |
| $D_{13}$ | 0.6199 | 0.5030 | 0.4535 |
| $D_{16}$ | 0.2453 | 0.4440 | 0.6359 |
| $D_{18}$ | 0.1994 | 0.2269 | 0.1747 |

The numbers not in parentheses in Table 6 are for the conjugate position at infinity on the enlarging side. The numbers in parentheses in Table 6 are the group spacings on the enlarging side at the near point, which is positioned 114.9 (normalized units) from the enlarging side of the lens.

FIGS. 6A–6D show the spherical aberration, astigmatism, distortion, and lateral color, respectively, of the zoom lens of Embodiment 2 at the wide-angle end. FIGS. 6E–6H show the spherical aberration, astigmatism, distortion, lateral color, respectively, of the zoom lens of Embodiment 2 at the intermediate focal length, and FIGS. 6I–6L show the spherical aberration, astigmatism, distortion, and lateral color, respectively, of the zoom lens of Embodiment 2 at the telephoto end. In FIGS. 6A, 6E and 6I, the spherical aberration is shown for the wavelengths 587.6 nm (the d-line), 486.1 nm (the F-line), 656.3 nm (the C-line). In the remaining figures, ω is the half-picture angle. In FIGS. 6B, 6F and 6J, the astigmatism is shown for both the sagittal image surface S and the tangential image surface T. In FIGS. 6C, 6G and 6K, distortion is measured at 587.6 nm (the d-line). In FIGS. 6D, 6H and 6L, the lateral color shown for the wavelengths 486.1 nm (the F-line) and 656.3 nm (the C-line) relative to the 587.6 nm (the d-line). As is apparent from these figures, the various aberrations are favorably corrected.

Embodiment 3

Figure 3:
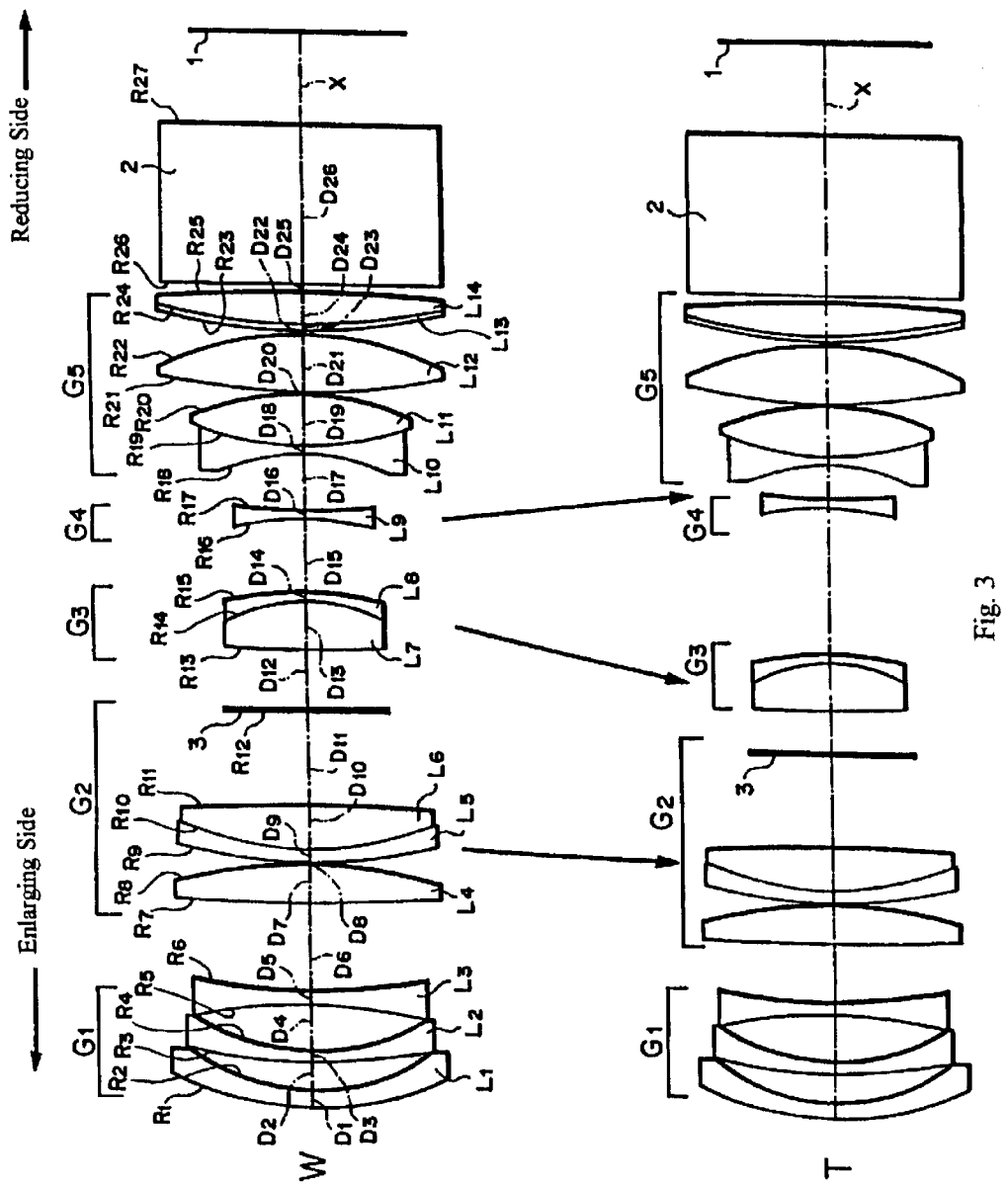
FIG. 3 shows a cross-sectional view of Embodiment 3 of the zoom lens of the present invention at the wide-angle end W and the telephoto end T.

FIG. 3 shows the basic lens element configurations of the zoom lens of Embodiment 3 applied to a projection optical apparatus as a projection lens at the wide-angle end W and at the telephoto end T. Embodiment 3 is similar to Embodiments 1 and 2 and similarly uses five lens groups. Because Embodiment 3 is similar to Embodiments 1 and 2, only the differences between Embodiment 3 and Embodiments 1 and 2 will be explained.

The zoom lens of Embodiment 3 differs from the zoom lenses of Embodiments 1 and 2 in that it includes only one aspheric lens surface, which is formed on the enlarging-side lens surface of a plastic lens element $L_{13}$. The plastic lens element has its other side bonded to the enlarging-side surface of lens element $L_{14}$, (i.e., the last lens element on the imaging-reducing side of the fifth lens group $G_5$). Additionally, the zoom lens of Embodiment 3 differs from the zoom lenses of Embodiments 1 and 2 in that the doublet of the second lens group $G_2$ consists of, in order from the enlarging side, a negative lens element $L_5$ and a positive lens element $L_6$.

Table 7 below lists the surface number #, in order from the enlarging side, the radius of curvature R of each surface near the optical axis, the on-axis surface spacing D, as well as the refractive index $N_d$ and the Abbe number $v_d$ (at the d line) of each lens element for Embodiment 3. The numerical values of R and D are based on a normalized focal length of 1 at the wide-angle end configuration of the zoom lens of Embodiment 3.

TABLE 7

| # | R | D | $N_d$ | $v_d$ |
|---|---|---|---|---|
| 1 | 1.6072 | 0.0844 | 1.80100 | 35.0 |
| 2 | 1.0271 | 0.1524 | | |
| 3 | 2.6389 | 0.0708 | 1.83400 | 37.2 |
| 4 | 1.2132 | 0.2434 | | |
| 5 | −2.5631 | 0.0626 | 1.72916 | 54.7 |
| 6 | 3.4426 | $D_6$ (variable) | | |
| 7 | 10.0372 | 0.2165 | 1.77250 | 49.6 |
| 8 | −2.4547 | 0.0068 | | |
| 9 | 2.9188 | 0.0653 | 1.57501 | 41.5 |
| 10 | 1.6581 | 0.2292 | 1.81600 | 46.6 |
| 11 | −10.1866 | 0.5172 | | |
| 12 | ∞ (stop) | $D_{12}$ (variable) | | |
| 13 | 6.3095 | 0.2627 | 1.64000 | 60.1 |
| 14 | −0.7905 | 0.0436 | 1.72000 | 42.0 |
| 15 | −1.9157 | $D_{15}$ (variable) | | |
| 16 | −1.4753 | 0.0408 | 1.60342 | 38.0 |

TABLE 7-continued

| # | R | D | $N_d$ | $v_d$ |
|---|---|---|---|---|
| 17 | 5.8621 | $D_{17}$ (variable) | | |
| 18 | −1.0593 | 0.0517 | 1.84667 | 23.8 |
| 19 | 1.5571 | 0.2744 | 1.56384 | 60.7 |
| 20 | −1.4600 | 0.0068 | | |
| 21 | 3.5899 | 0.3113 | 1.83400 | 37.2 |
| 22 | −1.6946 | 0.0174 | | |
| 23* | 2.4423 | 0.0082 | 1.52771 | 41.8 |
| 24 | 3.1161 | 0.2062 | 1.63854 | 55.4 |
| 25 | −8.0842 | 0.0272 | | |
| 26 | ∞ | 0.8716 | 1.51633 | 64.1 |
| 27 | ∞ | | | |

The surface with an * to the right of the surface number in Table 7 is aspherical, and the aspherical surface shape is expressed by Equation (A) above.

Table 8 below lists the values of the constants K, $A_4$, $A_6$, $A_8$, and $A_{10}$ used in Equation (A) above for the aspherical surface indicated in Table 7. An "E" in the data indicates that the number following the "E" is the exponent to the base 10. For example, "1.0E-02" represents the number $1.0 \times 10^{-2}$.

TABLE 8

| # | K | $A_4$ | $A_6$ | $A_8$ | $A_{10}$ |
|---|---|---|---|---|---|
| 23 | 0.9852 | −7.661E−2 | 9.505E−3 | −4.604E−2 | 9.532E−3 |

As is apparent from Tables 7 and 8 and FIG. 3, in the zoom lens of Embodiment 3, surface #23 is aspherical. As set forth above, the aspherical surface is one surface of a plastic lens element of which the other lens surface is bonded to a glass lens element.

In the zoom lens of Embodiment 3, the second lens group $G_2$, the third lens group $G_3$, and the fourth lens group $G_4$ move during zooming. Therefore, the values of the on-axis spacings $D_6$, $D_{12}$, $D_{15}$, and $D_{17}$ between the lens groups change with zooming. Table 9 below lists the values of the variables $D_6$, $D_{12}$, $D_{15}$, and $D_{17}$ (i.e., the group spacings) at the wide-angle end (Wide), at an intermediate focal length (Middle) and at the telephoto end (Tele).

TABLE 9

| # | Wide | Middle | Tele |
|---|---|---|---|
| $D_6$ | 0.4739 | 0.3820 | 0.3013 |
| | (0.4799) | (0.3880) | (0.3073) |
| $D_{12}$ | 0.3280 | 0.2452 | 0.2167 |
| $D_{15}$ | 0.3970 | 0.5903 | 0.8008 |
| $D_{17}$ | 0.3096 | 0.2909 | 0.1897 |

The numbers not in parentheses in Table 9 are for the conjugate position at infinity on the enlarging side. The numbers in parentheses in Table 9 are the group spacings on the enlarging side at the near point, which is positioned 115.8 (normalized units) from the enlarging side of the lens.

FIGS. 7A–7D show the spherical aberration, astigmatism, distortion, and lateral color, respectively, of the zoom lens of Embodiment 3 at the wide-angle end. FIGS. 7E–7H show the spherical aberration, astigmatism, distortion, lateral color, respectively, of the zoom lens of Embodiment 3 at the intermediate focal length, and FIGS. 7I–7L show the spherical aberration, astigmatism, distortion, and lateral color, respectively, of the zoom lens of Embodiment 3 at the telephoto end. In FIGS. 7A, 7E and 7I, the spherical aberration is shown for the wavelengths 587.6 nm (the d-line), 486.1 nm (the F-line), and 656.3 nm (the C-line). In the remaining figures, ω is the half-picture angle. In FIGS. 7B, 7F and 7J, the astigmatism is shown for both the sagittal image surface S and the tangential image surface T. In FIGS. 7C, 7G and 7K, distortion is measured at 587.6 nm (the d-line). In FIGS. 7D, 7H and 7L, the lateral color is shown for the wavelengths 486.1 nm (the F-line) and 656.3 nm (the C-line) relative to the 587.6 nm (the d-line). As is apparent from these figures, the various aberrations are favorably corrected.

Embodiment 4

Figure 4:
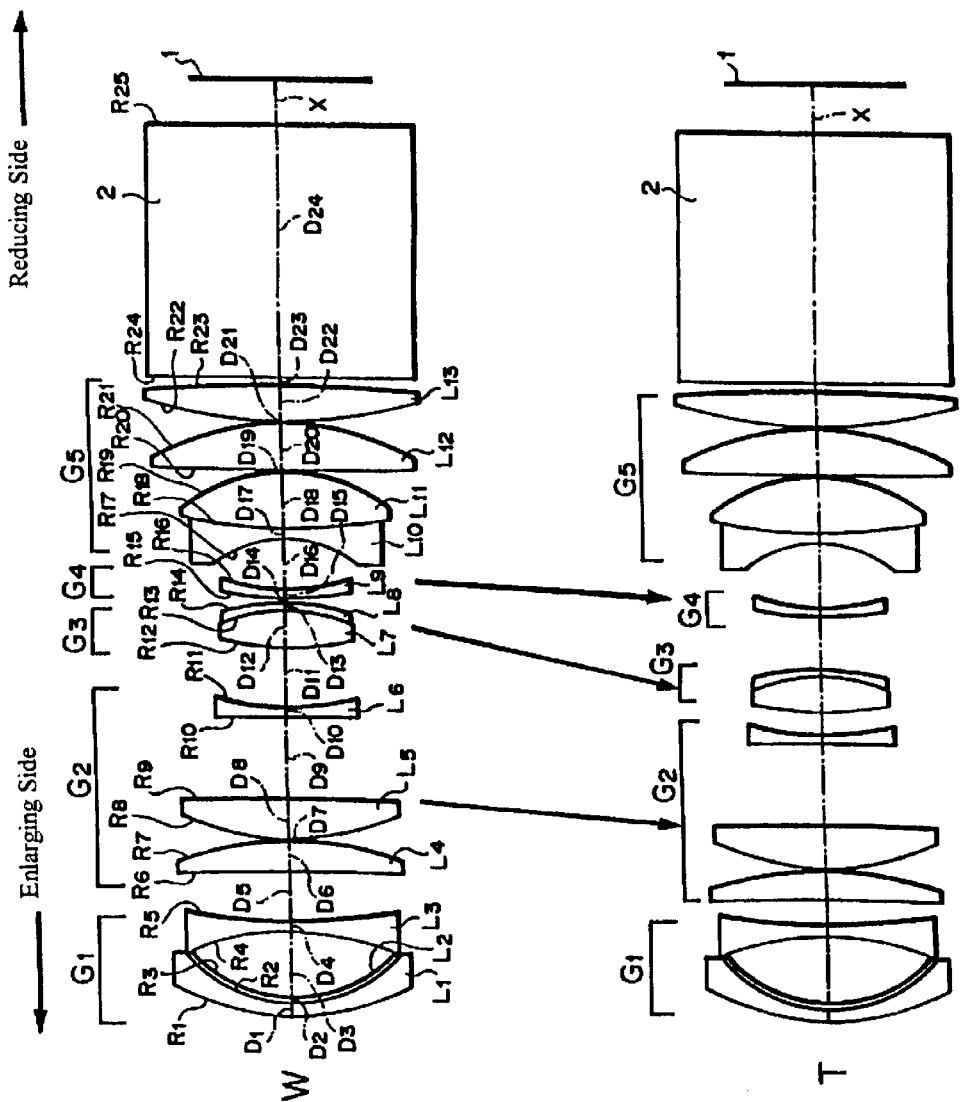
FIG. 4 shows a cross-sectional view of Embodiment 4 of the zoom lens of the present invention at the wide-angle end W and the telephoto end T.

FIG. 4 shows the basic lens element configurations of the zoom lens of Embodiment 4 applied to a projection optical apparatus as a projection lens at the wide-angle end W and at the telephoto end T. Embodiment 4 is similar to Embodiments 1 and 2 and similarly uses five lens groups. Because Embodiment 4 is similar to Embodiments 1 and 2, only the differences between Embodiment 4 and Embodiments 1 and 2 will be explained.

The zoom lens of Embodiment 4 differs from the zoom lenses of Embodiments 1 and 2 in that, in this embodiment, the first lens group $G_1$ consists of three lens elements $L_1$ to $L_3$. Additionally, the zoom lens of Embodiment 4 includes only one aspheric lens surface, which is formed on the reducing-side lens surface of a plastic lens element $L_2$. The other surface of the plastic lens element $L_2$ is bonded to reducing side of the lens element L, which is a negative meniscus lens. The second lens group $G_2$ consists of three lens components $L_4$ to $L_6$, and no stop is provided.

Table 10 below lists the surface number #, in order from the enlarging side, the radius of curvature R of each surface near the optical axis, the on-axis surface spacing D, as well as the refractive index $N_d$ and the Abbe number $v_d$ (at the d line) of each lens element for Embodiment 4. The numerical values of R and D are based on a normalized focal length of 1 at the wide-angle end configuration of the zoom lens of Embodiment 4.

TABLE 10

| # | R | D | $N_d$ | $v_d$ |
|---|---|---|---|---|
| 1 | 1.2486 | 0.0563 | 1.80519 | 25.4 |
| 2 | 0.7031 | 0.0090 | 1.52771 | 41.8 |
| 3* | 0.6627 | 0.3645 | | |
| 4 | −1.3791 | 0.0466 | 1.49700 | 81.5 |
| 5 | 4.2344 | $D_5$ (variable) | | |
| 6 | −13.3753 | 0.1470 | 1.81600 | 46.6 |
| 7 | −1.8031 | 0.0073 | | |
| 8 | 1.3149 | 0.2174 | 1.83481 | 42.7 |
| 9 | −12.3879 | 0.4246 | | |
| 10 | −13.4357 | 0.0384 | 1.48750 | 70.2 |
| 11 | 1.2583 | $D_{11}$ (variable) | | |
| 12 | 1.6676 | 0.1852 | 1.51633 | 64.1 |
| 13 | −0.8194 | 0.0348 | 1.83400 | 37.2 |
| 14 | −1.2570 | $D_{14}$ (variable) | | |
| 15 | 2.2313 | 0.0348 | 1.60342 | 38.0 |
| 16 | 0.9515 | $D_{16}$ (variable) | | |
| 17 | −0.5906 | 0.0419 | 1.84667 | 23.8 |
| 18 | 2.7630 | 0.2834 | 1.60300 | 65.4 |
| 19 | −0.8988 | 0.0072 | | |
| 20 | 24.9171 | 0.2414 | 1.83481 | 42.7 |
| 21 | −1.4189 | 0.0073 | | |
| 22 | 2.5056 | 0.1848 | 1.83400 | 37.2 |
| 23 | −7.7238 | 0.0359 | | |
| 24 | ∞ | 1.2906 | 1.51633 | 64.1 |
| 25 | ∞ | | | |

The surface with an * to the right of the surface number in Table 10 is aspherical, and the aspherical surface shape is expressed by Equation (A) above.

Table 11 below lists the values of the constants K, $A_4$, $A_6$, $A_8$, and $A_{10}$ used in Equation (A) above for the aspherical surface indicated in Table 10. An "E" in the data indicates that the number following the "E" is the exponent to the base 10. For example, "1.0E-02" represents the number $1.0 \times 10^{-2}$.

TABLE 11

| # | K | $A_4$ | $A_6$ | $A_8$ | $A_{10}$ |
|---|---|---|---|---|---|
| 3 | 0.5834 | 3.633E-2 | -2.045E-2 | 7.839E-4 | 1.340E-3 |

As is apparent from Tables 10 and 11 and FIG. 4, in the zoom lens of Embodiment 4, surface #3 is aspherical. As set forth above, the aspherical surface is one surface of a plastic lens element, with the other surface thereof bonded to a glass lens element.

In the zoom lens of Embodiment 4, each of the second lens group $G_2$, the third lens group $G_3$, and the fourth lens group $G_4$ moves during zooming. Therefore, the values of the on-axis spacings $D_5$, $D_{11}$, $D_{14}$ and $D_{16}$ between the lens groups change with zooming. Table 12 below lists the values of the variables $D_5$, $D_{11}$, $D_{14}$ and $D_{16}$ (i.e., the group spacings) at the wide-angle end (Wide), at an intermediate focal length (Middle) and at the telephoto end (Tele).

TABLE 12

| # | Wide | Middle | Tele |
|---|---|---|---|
| $D_5$ | 0.2538 | 0.1852 | 0.1342 |
|  | (0.2622) | (0.1936) | (0.1426) |
| $D_{11}$ | 0.3171 | 0.2152 | 0.1255 |
| $D_{14}$ | 0.0286 | 0.1582 | 0.2738 |
| $D_{16}$ | 0.2713 | 0.3124 | 0.3374 |

The numbers not in parentheses in Table 12 are for the conjugate position at infinity on the enlarging side. The numbers in parentheses in Table 12 are the group spacings on the enlarging side at the near point, which is positioned 105.2 (normalized units) from the enlarging side of the lens.

FIGS. 8A–8D show the spherical aberration, astigmatism, distortion, and lateral color, respectively, of the zoom lens of Embodiment 4 at the wide-angle end. FIGS. 8E–8H show the spherical aberration, astigmatism, distortion, lateral color, respectively, of the zoom lens of Embodiment 4 at the intermediate focal length, and FIGS. 8I–8L show the spherical aberration, astigmatism, distortion, and lateral color, respectively, of the zoom lens of Embodiment 4 at the telephoto end. In FIGS. 8A, 8E and 8I, the spherical aberration is shown for the wavelengths 587.6 nm (the d-line), 486.1 nm (the F-line), and 656.3 nm (the C-line). In the remaining figures, ω is the half-picture angle. In FIGS. 8B, 8F and 8J, the astigmatism is shown for both the sagittal image surface S and the tangential image surface T. In FIGS. 8C, 8G and 8K, distortion is measured at 587.6 nm (the d-line). In FIGS. 8D, 8H and 8L, the lateral color is shown for the wavelengths 486.1 nm (the F-line) and 656.3 nm (the C-line) relative to the 587.6 nm (the d-line). As is apparent from these figures, the various aberrations are favorably corrected.

Figure 9:
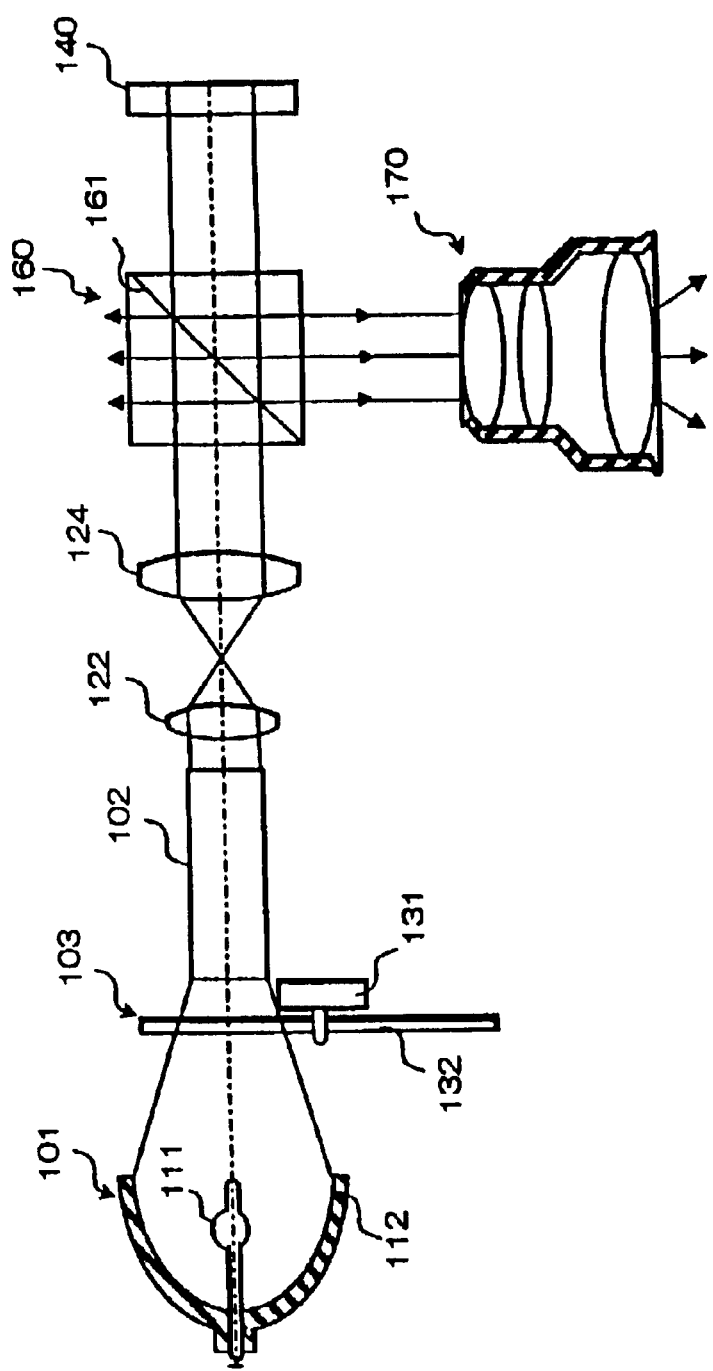
FIG. 9 shows a projection optical apparatus in which a zoom lens of the invention may be used.

An example of a projection optical apparatus in which a zoom lens of the invention may be used is shown in FIG. 9. The projection optical apparatus of FIG. 9 is a projection-type display apparatus in which sequential color techniques and a reflecting-type liquid crystal display element are used.

The projection-type display apparatus includes a light unit 101 consisting of a light source 111 and a reflector 112, a color wheel 103 having a circular plate 132 that is freely rotated by a rotation motor 131 to selectively pass light having specified wavelengths in the light flux emitted from the light unit 101, a rod integrator 102 for homogenizing the colored light selectively passed through the color wheel 103 for more uniform cross-sectional intensity of the output light from the rod integrator, a converging lens 122, a collimator lens 124, and a polarization sensitive beamsplitter 160. The polarization sensitive beamsplitter 160 selectively transmits part of the incident colored light to a reflecting-type liquid crystal display element 140. The reflecting-type liquid crystal display element 140 reflects the colored light back to the polarization sensitive reflecting surface 161 of the beamsplitter 160 that, in turn, reflects the colored light carrying image information to a projection lens 170 (schematically shown) that may project a colored light image onto a display screen (not shown).

The present invention is not limited to the aforementioned embodiments, as it will be obvious that various alternative implementations are possible. For instance, values such as the radius of curvature R of each of the lens elements and components, the surface spacings D, the refractive index N, as well as the Abbe number $v_d$, are not limited to the examples indicated in each of the aforementioned embodiments, as other values can be adopted. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A zoom lens comprising:
    a lens group of negative refractive power that is positioned at the enlarging end of the zoom lens; and
    a lens group of positive refractive power that is positioned at the reducing end of the zoom lens;
wherein
    both the lens groups are fixed during zooming;
    at least one of the lens groups includes a plastic lens element having a lens surface that is bonded to a lens surface of a glass lens element, and the other lens surface of the plastic lens element has an aspheric shape, the plastic lens element having an on-axis thickness that is less than one-quarter the on-axis thickness of the glass lens element to which it is bonded; and
    the lens group of negative refractive power includes lens elements only of negative refractive power.

2. The zoom lens of claim 1, the zoom lens being telecentric on the reducing side.

3. The zoom lens of claim 1, wherein the lens group of negative refractive power is moved for focusing the zoom lens.

4. The zoom lens of claim 2, wherein the lens group of negative refractive power is moved for focusing the zoom lens.

5. The zoom lens of claim 1, wherein the lens group that is positioned at the enlarging end and the lens group that is positioned at the reducing end each includes a plastic lens element having one lens surface thereof bonded to a respective glass lens element and the other lens surface is aspheric in shape; and
    one plastic lens element has positive refractive power and the other plastic lens element has negative refractive power.

6. The zoom lens of claim 2, wherein the lens group that is positioned at the enlarging end and the lens group that is positioned at the reducing end each includes a plastic lens element having one lens surface bonded to a respective glass lens element, and the other lens surface of the plastic lens element is aspheric in shape; and one plastic lens element has positive refractive power and the other plastic lens element has negative refractive power.

7. The zoom lens of claim 3, wherein the lens group that is positioned at the enlarging end and the lens group that is positioned at the reducing end each includes a plastic lens element having one lens surface bonded to a respective glass lens element, and the other lens surface of the plastic lens element is aspheric in shape; and one plastic lens element has positive refractive power and the other plastic lens element has negative refractive power.

8. The zoom lens of claim 4, wherein the lens group that is positioned at the enlarging end and the lens group that is positioned at the reducing end each includes a plastic lens element having one lens surface bonded to a respective glass lens element, and the other lens surface of the plastic lens element is aspheric in shape; and one plastic lens element has positive refractive power and the other plastic lens element has negative refractive power.

9. An optical projection apparatus that includes the zoom lens as set forth in claim 1.

10. A zoom lens comprising:

a lens group of negative refractive power that is positioned at the enlarging end of the zoom lens; and a lens group of positive refractive power that is positioned at the reducing end of the zoom lens;

wherein both the lens groups are fixed during zooming;

the lens group of negative refractive power includes two lens components of negative refractive power;

one lens component of the two lens components is at the enlarging end of the zoom lens and includes a meniscus lens element of negative refractive power;

the other lens component of the two lens components is adjacent the lens component at the enlarging end, and includes a biconcave lens component;

at least one of the two lens groups includes a plastic lens element having a lens surface bonded to a glass lens element;

the other lens surface of the plastic lens element has an aspheric shape; and the plastic lens element has an on-axis thickness that is less than one-quarter the on-axis thickness of the glass lens element to which it is bonded.

11. The zoom lens of claim 10, the zoom lens being telecentric on the reducing side.

12. The zoom lens of claim 10, wherein the lens group of negative refractive power is moved for focusing the zoom lens.

13. The zoom lens of claim 11, wherein the lens group of negative refractive power is moved for focusing the zoom lens.

14. The zoom lens of claim 12, wherein the glass lens element to which the plastic lens element is bonded is a negative meniscus lens element, and the plastic lens element is bonded to a concave lens surface of the negative meniscus lens element.

15. The zoom lens of claim 14, wherein the plastic lens element is a negative meniscus lens element.

16. The zoom lens of claim 15, the zoom lens being telecentric on the reducing side.

17. An optical projection apparatus that includes the zoom lens as set forth in claim 10.

* * * * *